3,468,901
4-CYANOIMIDAZOLE-5-CARBOXAMIDE
Yoshitaka Yamada, 2129 Minamikase, Kawasaki-shi, and Izumi Kumashiro, 647 Osone-cho, Kohoku-ku, Yokohama-shi, both of Kanagawa-ken, Japan; Tadao Takenishi, 13 Tamagawanoge-cho, Setagaya-ku, and Katsumi Suzuki, 1631 Ikebukuro, Toshima-ku, both of Tokyo, Japan
No Drawing. Filed June 15, 1965, Ser. No. 464,216
Claims priority, application Japan, June 18, 1964, 39/34,539
Int. Cl. C07d 49/36
U.S. Cl. 260—309                 1 Claim

ABSTRACT OF THE DISCLOSURE 5-aminoimidazole-4-carboxamide is prepared from 4,5-dicyanoimidazole by hydrolyzing the last-mentioned compound in aqueous, strongly alkaline solution to 4-cyanoimidazole-5-carboxamide, subjecting the 4-cyanoimidazole-5-carboxamide to Hofmann Rearrangement to 4-cyano-5-aminoimidazole, and hydrolyzing the latter in a strongly alkaline aqueous medium. 5-aminoimidazole-4-carboxamide is an intermediate in the synthesis of other imidazole derivatives.

---

This invention relates to novel derivatives of imidazole, and to methods of preparing the new compounds.

The invention more specifically resides in the sequential conversion of 4,5-dicyanoimidazole to 4-cyanoimidazole-5-carboxamide, 5-amino-4-cyanoimidazole, and 5-aminoimidazole-4-carboxamide.

A convenient method of producing the starting material of the sequence of reactions has been disclosed in U.S. Patent No. 3,287,452. The end product and the intermediate compounds are useful in the synthesis of other imidazole derivatives.

We have found that 4,5-dicyanoimidazole of the formula

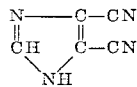

is selectively hydrolyzed in aqueous alkaline solutions to 4-cyanoimidazole-5-carboxamide of the formula

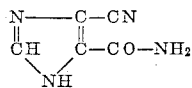

The hydrolysis reaction takes place in aqueous solutions of alkali metal hydroxides, such as NaOH and KOH, alkaline earth metal hydroxides, such as $Ca(OH)_2$, ammonium hydroxide, and mixtures of such strongly alkaline materials.

The concentration of the alkaline material in the hydrolysis mixture may be approximately between 0.1 normal and 10 normal but we prefer to operate with alkaline solutions that are approximately normal to 2-normal in the alkaline material.

The reaction takes place at all temperatures at which the aqueous hydrolysis mixture is liquid, that is approximately between 0° and 100° C. Operation at room temperature gives practical yields at practical rates but best results are obtained between 30° C. and 50° C.

The time required for completion of the reaction varies with the concentrations of the dicyanoimidazole and of the alkaline hydrolyzing agent, with the reaction temperature, and with secondary operating variables.

When the hydrolysis mixture is kept at an elevated temperature for excessive periods of time, dicyanoimidazole and cyanoimidazole carboxamide are lost by decomposition.

When the alkaline hydrolysis mixture is neutralized, cyanoimidazole carboxamide is precipitated in crystalline needle form. A yield of 90 percent or more is readily obtained. The precipitate is colorless and quite pure, and is suitable for further use without purification in most instances. It can be recrystallized from hot water. The hydrolysis mixture as such may be further processed without recovering the 4-cyano imidazol-5-carboxamide therefrom.

4-cyanoimidazole-5-carboxamide is only sparingly soluble in cold water but soluble in hot water. Its ultraviolet absorption spectrum has peaks at 250 m$\mu$ at pH 1, and at 275 m$\mu$ at pH 13. Infrared absorption bands are found at 2240 cm.$^{-1}$ (C=N) and 1695, 1620 cm.$^{-1}$ ($CONH_2$). Paper chromatography gives an $R_f$ value of 0.56–0.57 for a butanol—acetic acid—water developer, 4:1:1 by volume. The recrystallized material melts with decomposition.

4-cyanoimidazole-5-carboxamide may be further converted to 5-aminoimidazole-4-carboxamide as will be shown hereinbelow. It is also a useful intermediate in the synthesis of hypoxanthine derivatives, nucleosides and nucleotides.

The method of preparing 4-cyanoimidazole-5-carboxamide will be further illustrated by the following example.

EXAMPLE 1

10 g. dicyanoimidazole were dissolved in aqueous solutions of the hydrolyzing agent listed in the following table, and the hydrolysis mixtures obtained were kept for the indicated periods at the listed temperatures. The mixtures were thereafter neutralized with 6-normal hydrochloric acid. The crystalline precipitate formed thereby was separated from the mother liquor by filtration. The crystals were dried and weighed.

They were identified by ultraviolet and infrared spectra, and also by elementary analysis of the recrystallized material:

Analysis.—Calcd. for $C_5H_4N_4O$ (percent): C, 44.12; H, 2.96; N, 41.17. Found (percent): C, 44.25; H, 3.05; N, 41.25.

TABLE 1

| Run No. | Hydrolyzing Solution | Temp., °C. | Time, Hrs. | Yield Grams | Percent |
|---|---|---|---|---|---|
| 1 | 200 ml. 1 N NaOH | 40 | 6 | 11.2 | 97 |
| 2 | 100 ml. 2 N NaOH | 25 | 6 | 10.6 | 92 |
| 3 | 100 ml. 4 N NaOH | 25 | 6 | 11.0 | 96 |
| 4 | 200 ml. 7 N $NH_4OH$ | 100 | 50 | 11.0 | 96 |

When 4-cyanoimidazole-5-carboxamide is subjected to reaction with a halogenation agent in a strongly alkaline aqueous medium, it undergoes Hofmann Rearrangement to 5-amino-4-cyanoimidazole. The afore-mentioned alkali metal and alkaline earth metal hydroxides are suitable alkalinizing agents. The halogenation agents which have been found to be operative include chlorine, bromine, hypochlorous acid, hypobromous acid, and the water soluble salts of these acids. Bromine and the hypobromites are more conveniently handled but the less costly chlorine and hypochlorite are preferred in large scale operation. At least one mole of halogenation agent is preferably employed per mole of the cyanoimidazole carboxamide, and up to 2.5 moles of halogenation agent give very satisfactory results. The alkaline medium preferably is 0.1 to 2-normal with respect to the alkalinizing agent and is used in an amount sufficient to provide 2 to 10 moles of alkalinizing agent per mole of cyanomidazole carboxamide if the reaction is to give optimum yields.

The halogenation reaction produces an isocyanate in a manner known in itself. The isocyanate is hydrolyzed by means of 2 to 10 moles, typically about 4 moles, of alkali metal or alkaline earth metal hydroxide in 0.1 to 2 normal aqueous solution. The alkaline material present during the halogenation step may be employed for the hydrolysis.

The period required for completion of the Hofmann Rearrangement varies with the total amount and concentration of alkaline material, the reaction temperature and similar process variables. The preferred range of operating conditions results in completion of the halogenation within 10 minutes to 2 hours, and the hydrolysis of the isocyanate may take one to four hours.

Both reactions may be performed at room temperature but we prefer to carry out the halogenation between −5° and +5° C., and the subsequent hydrolysis between 50° and 100° C.

The 5-amino-4-cyanoimidazole may be recovered from the hydrolysis mixture, if so desired, by passing the mixture over a cation exchange resin in the H form which adsorbs the compound, thereafter washing the resin and eluting the desired compound with dilute aqueous ammonium hydroxide. Colorless needles of 5-amino-4-cyanoimidazole are obtained when the eluate is partly evaporated in a vacuum, decolorized with activated charcoal and cooled to room temperature.

Other methods of recovering the 5-amino-4-cyanoimidazole from the hydrolysis mixture will readily suggest themselves to organic chemists, and such recovery is unnecessary if the 5-amino-4-cyanoimidazole is to be further processed. The compound is an intermediate for the synthesis of 5-aminoimidazole-4-carboxamide, and of hypoxanthine derivatives, nucleosides and nucleotides.

The following Example further illustrates the Hofmann Rearrangement of 4-cyanoimidazole-5-carboxamide.

EXAMPLE 2

13.6 g. (0.1 mole) 4-cyanoimidazole-5-carboxamide obtained by the procedure of Example 1 were dissolved in 350 ml. of 2.33 N aqueous sodium hydroxide solution (0.9 moles NaOH). 16 g. (0.1 mole) bromine were added to the solution which was then kept at 0° C. for 30 minutes. It was thereafter heated to 70–75° C. for three hours.

The hydrolysis mixture so obtained was passed over a column of a strongly acidic cation exchange resin (Amberlite IR–120 in the H form), the resin was washed with water and the column was eluted with 3N aqueous ammonium hydroxide.

The eluate was partly evaporated in a vacuum, the residue was decolorized with activated carbon, and the filtrate from the carbon treatment was cooled. The crystals precipitated thereby were recrystallized from hot water. The yield was 2.5 g. (21%). The melting point of the compound was 129–129.5° C. (decomp., uncorr.).

The product was identified by elementary analysis:
Analysis.—Calcd. for $C_4H_4N_4$ (percent); C, 44.44; H, 3.73; N, 51.83. Found (percent): C, 44.57; H, 3.98; N, 52.15.

The ultraviolet absorption spectrum showed maxima at pH 1 and 236–237 mμ and at pH 11 and 254–255 mμ.

EXAMPLE 3

1.28 l. chlorine gas (22° C., atmospheric pressure) were introduced into 600 ml. 0.22 N aqueous sodium hydroxide solution at 0° C. with stirring. 6 g. 4-cyanoimidazole-5-carboxamide were added, and the mixture was kept at 0° C. for 130 minutes. 120 ml. 1.5 N aqueous sodium hydroxide solution were then added, and the resulting hydrolysis mixture was heated to 80–85° C. for three hours.

The reaction mixture was worked up in the manner described in Example 2, and 3.1 g. crude crystals of 5-amino-4-cyanoimidazole were obtained, and identified as in Example 2.

5-amino-4-cyanoimidazole is hydrolyzed with substantially 100% yield to the known 5-aminoimidazole-4-carboxamide

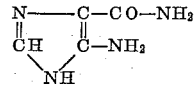

by heating in an aqueous solution of alkali metal or alkaline earth hydroxides, preferably 0.2 to 6 normal with respect to the alkalinizing agent. The total amount of alkaline material should be sufficient to dissolve the aminoimidazole carboxamide but is otherwise not critical.

The preferred temperature for the hydrolysis is inversely related to the concentration of the alkali material, a low temperature being preferred for high concentrations of alkaline material, and vice versa. The reaction proceeds with adequate speed at temperatures of 60–100° C. with strong (6-normal) alkali or alkaline earth metal hydroxide solutions, but we prefer to operate at lower alkaline material concentrations and at temperatures between 100 and 150° C. The concentration of the desired product reaches a maximum in a few hours at the preferred operating conditions but the reaction time varies with the temperature and with the concentration of the reactants in the usual manner.

The 5-aminoimidazole-4-carboxamide may be separated from the reaction mixture in any desired manner. We prefer to use a strongly acidic cation exchange resin to recover the compound from the mixture and to elute it from the washed resin with dilute aqueous ammonium hydroxide. When the eluate is partly evaporated in a vacuum until all ammonia is removed, adjusted to pH 1 with any strong acid and further evaporated in a vacuum to a small volume, crude crystals are precipitated upon cooling of the residue. They can be recrystallized from hot water.

The hydrolysis of 5-amino-4-cyanoimidazole to 5-aminoimidazole-4-carboxamide is further illustrated by the following examples.

EXAMPLE 4

3.5 g. of 5-amino-4-cyanoimidazole were dissolved in 200 ml. of 1.5 N aqueous sodium hydroxide, and the resulting solution was heated to 125–130° C. for six hours. A specimen of the reaction mixture was diluted to a known volume, and 0.02 ml. of the diluted specimen were subjected to paper chromatography with an n-butanol—concentrated ammonium hyroxide—water developer, 20:12:13 by volume. The part of the chromatogram corresponding to $R_f$ 0.58 was cut out and exhaustively extracted with 0.1 N hydrochloric acid. The absorbency of the extract was measured at 260–340 mμ by means of an ultraviolet spectrophotometer. The yield of 5-aminoimidazole-4-carboxamide was calculated from the photometric data as 98%.

The remainder of the reaction mixture was passed over a column of Amberlite IR–120, the resin was washed with water, and the desired product was eluted with 3 N aqueous ammonium hydroxide.

The eluate was partly evaporated in a vacuum to expel the ammonia and was then acidified to pH 1 with hydrochloric acid. Evaporation was thereafter continued to dryness, the residue was washed with a small amount of methanol and dried. The crude crystals so obtained weighed 4.7 g. (90% yield).

The product was identified by its known melting point of 254–255° C. after recrystallization from hot water, and by its elementary analysis as 5-aminoimidazole-4-carboxamide hydrochloride.

Analysis.—Calcd. (percent) for $C_4H_6N_4O \cdot HCl$: C, 29.55; H, 4.34; N, 34.46. Found (percent): C, 29.94; H, 4.55; N, 34.92.

EXAMPLE 5

The influence of the hydrolyzation temperature on the yield of 5-aminoimidazole-4-carboxamide hydrochloride under otherwise fixed operating conditions was determined in a series of runs in which one mole 5-amino-4-cyanoimidazole and 8.5 moles sodium hydroxide were held six hours at the various temperatures listed below in a solution containing enough water to make the solution 0.585 normal with respect to the NaOH. The procedure of Example 4 was followed in all other process characteristics.

| Temperature, °C: | Yield, percent |
|---|---|
| 110 | 75 |
| 115 | 83 |
| 120 | 90 |
| 125 | 95 |
| 130 | 98 |
| 135 | 95 |

EXAMPLE 6

0.1 mole ,4-cyanoimidazole-5-carboxamide and 0.12 moles chlorine were mixed with 0.22 N aqueous sodium droxide, and the resulting solution was kept at 0° C. for 30 minutes.

Enough 1.5 normal sodium hydroxide solution was added to make the mixture 0.3 normal in NaOH, and it was then heated to 80–85° C. for three hours. The mixture now contained 5-amino-4-cyanoimidazole. It was divided into several batches.

A first group of batches was heated for six hours to the various temperatures listed below, and the yield of 5-aminoimidazole-4-carboxamide was determined on the basis of the starting material.

| Temperature, °C: | Yield, percent |
|---|---|
| 120 | 67 |
| 125 | 70 |
| 130 | 69 |
| 135 | 63 |
| 110 | 58 |

A second group of batches was heated to 130° C. for the periods listed below to produce the indicated yields:

| Time, hours | Yield, percent |
|---|---|
| 4 | 63 |
| 5 | 67 |
| 6 | 69 |
| 8 | 64 |
| 10 | 62 |

EXAMPLE 7

The general procedure of Example 4 was folowed in a series of hydrolysis runs using one gram 5-amino-4-cyanoimidazole and 30 ml. of sodium hydroxide solutions of varying concentration, a fixed temperature of 100° C., and hydrolysis periods varying between 30 minutes and six hours.

The hydrolysis mixtures so obtained were analyzed for 5-amino-4-cyanoimidazole (Compound A) and 5-aminoimidazole-4-carboxamide (Compound B) by paper chromatography. The amount of unreacted Compound A and the yield of Compound B for each run are listed in Table 2.

TABLE 2

| Conc. of NaOH | Unreacted Comp'd. A, Percent, After— | | | Yield of Comp'd. B, Percent, After— | | |
|---|---|---|---|---|---|---|
| | 0.5 hr. | 3 hrs. | 6 hrs. | 0.5 hr. | 3 hrs. | 6 hrs. |
| 0.1 N | 94.5 | 88.1 | 61.3 | | 12.7 | 38.8 |
| 1 N | 75.1 | 31.6 | 0 | 23.9 | 66.1 | 100 |
| 3 N | 20.8 | 0 | 0 | 78.7 | 100 | 100 |
| 6 N | 0 | 0 | | 100 | 99.2 | |

EXAMPLE 8

A mixture of 5 ml. 3 N sodium hydroxide solution and 0.5 g. 5-amino-4-cyanoimidazole was refluxed for three hours. The reaction mixture was treated with activated charcoal and filtered. The filtrate was acidified with strong hydrochloric acid (about 6-normal) and partly evaporated in a vacuum. Crystals of 5-aminoimidazole-4-carboxamide hydrochloride were precipitated, filtered off, and dried. They weighed 0.64 g. (85% yield). A specimen recrystallized from hot water was identified as the known compound by its infrared spectrum.

EXAMPLE 9

A mixture of 10 ml. of 1 N aqueous sodium hydroxide and 1 g. 5-amino-4-cyanoimidazole was refluxed as in Example 8 and purified by means of activated charcoal. The filtrate obtained after the charcoal treatment was adjusted to pH 8 with hydrochloric acid and partly evaporated in a vacuum. A precipitate of 1.0 g. crystalline 5-aminoimidazole-4-carboxamide was recovered (90% yield) and identified by its infrared spectrum.

What I claim is:
1. 4-cyanoimidazole-5-carboxamide.

References Cited

UNITED STATES PATENTS

| 2,471,518 | 5/1949 | Duesel et al. | 260—558 |
| 2,534,331 | 12/1950 | Woodward | 260—309 |
| 2,756,228 | 7/1956 | Hitchings et al. | 260—309 |
| 2,897,205 | 7/1959 | Leanza | 260—309 |
| 3,187,006 | 6/1965 | Druey et al. | 260—310 |

OTHER REFERENCES

Migrdichian Organic Synthesis, vol. 1, p. 429, N.Y., Reinhold, 1957.

JOHN D. RANDOLPH, Primary Examiner

N. TROUSOF, Assistant Examiner